United States Patent [19]

Teraoka

[11] 4,265,349
[45] May 5, 1981

[54] HUB CLUTCH
[75] Inventor: Masao Teraoka, Sano, Japan
[73] Assignee: Tochigi-Fuji Sangyo Kabushiki Kaisha, Tochigi, Japan
[21] Appl. No.: 968,356
[22] Filed: Dec. 7, 1978
[30] Foreign Application Priority Data
Dec. 12, 1977 [JP] Japan .................. 52-166772[U]
[51] Int. Cl.³ .......................................... F16D 19/00
[52] U.S. Cl. ................................. 192/95; 192/67 R; 403/1
[58] Field of Search ............... 192/67 R, 49, 94, 95; 403/1

[56] References Cited
U.S. PATENT DOCUMENTS

| 3,124,377 | 3/1964 | O'Brien et al. ............... 403/1 |
| 3,217,847 | 11/1965 | Petrak ..................... 192/67 R X |
| 3,442,361 | 5/1969 | Hegar .......................... 403/1 X |
| 3,669,476 | 6/1972 | Wilson ............................ 403/1 |
| 3,753,479 | 8/1973 | Williams ....................... 403/1 X |
| 3,934,688 | 1/1976 | Sides et al. ................. 192/67 R X |
| 4,007,820 | 2/1977 | Kagata ........................ 192/67 R |

FOREIGN PATENT DOCUMENTS 1523402  8/1978  United Kingdom ............... 403/1

Primary Examiner—George H. Krizmanich
Assistant Examiner—Moshe I. Cohen
Attorney, Agent, or Firm—Wenderoth, Lind & Ponack

[57] ABSTRACT

A hub clutch comprises a drive clutch adapted to be connected to a power shaft, an axially movable driven clutch to be coupled with the drive clutch and having semi-circular grooves for connection to a wheel hub, a case secured to the wheel hub by means of a plurality of bolts, coupling means providing a preload on the driven clutch, and actuator means for effecting movement of the driven clutch toward the drive clutch by the operation of the coupling means wherein the torque of the driven clutch is conveyed to the wheel hub by the engagement between the semi-circular grooves and the bolts.

6 Claims, 3 Drawing Figures

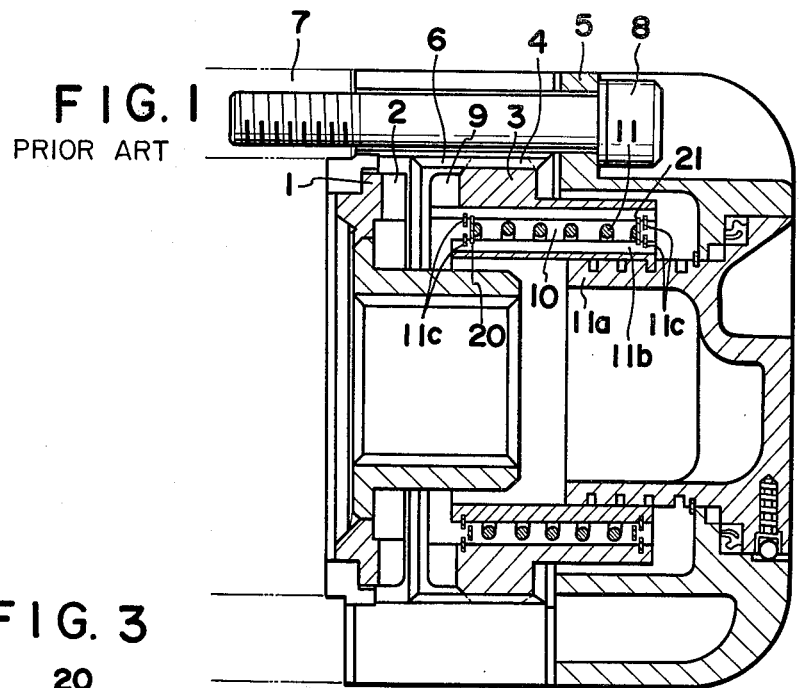
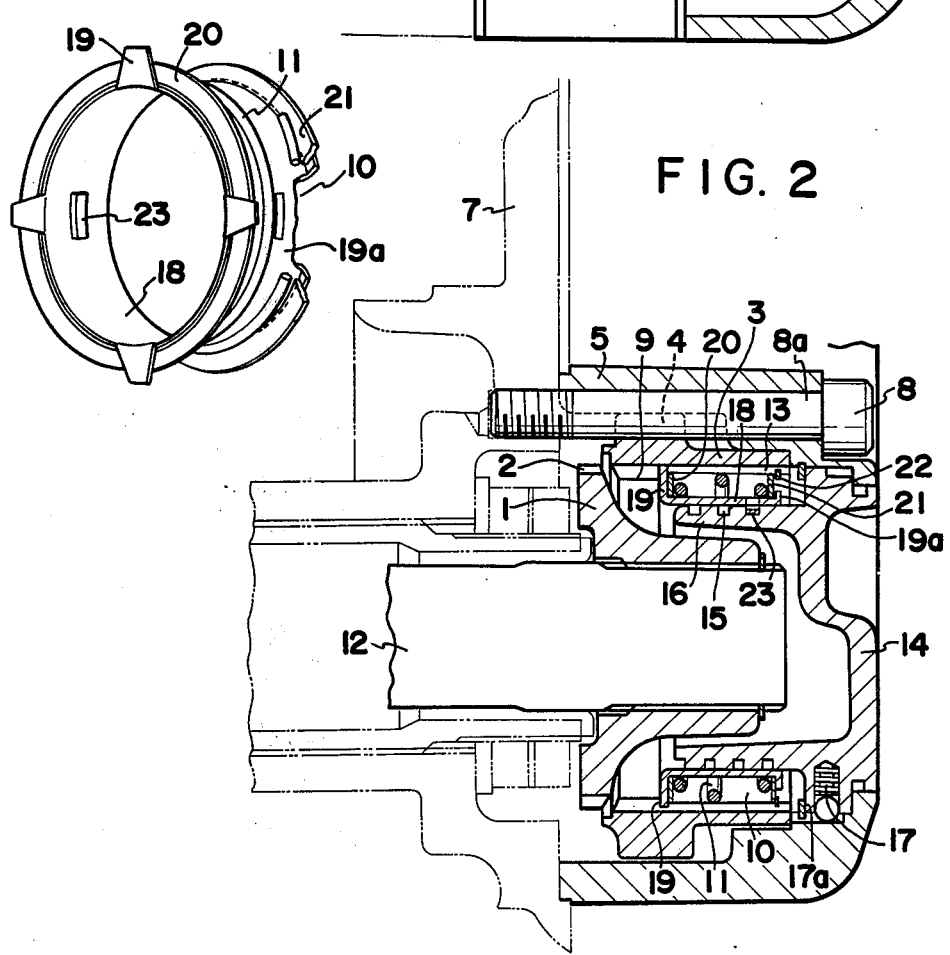

HUB CLUTCH

BACKGROUND OF THE INVENTION

This invention relates to hub clutches and more particularly to such a clutch for the front wheels of a four wheel drive vehicle.

In FIG. 1, there is shown a conventional hub clutch for the front wheels of a four wheel drive vehicle. This clutch comprises a drive clutch 1 having coupling teeth 2 connected to a power shaft, a driven clutch 3 having coupling teeth 9 and a spline 4 axially provided at its outer periphery, a case 5 having a spline 6 axially provided on its inner surface which is coupled with a wheel hub 7 by a plurality of bolts 8, and coupling means 10 having a spring 11 to provide a preload on the driven clutch 3 toward the drive clutch 1. The spring 11 is positioned in a sleeve-like space which is formed of a sleeve member 11a and a lower portion of the driven clutch 3. The sleeve member 11a is provided with grooves 11b to hold a pair of washers 20 and 21 between which the spring 11 is inserted. Further, four snap rings 11C are installed in the sleeve-like space to control the axial movement of the washers 20 and 21. In operation, the torque of the drive clutch 1 is conveyed to the driven clutch 3 through the coupled teeth 2 and 9 as the movement of the driven clutch 3 is effected toward the drive clutch 1 by the coupling means 10. This causes the case 5 to rotate in the connection between the spline 4 of the driven clutch 3 and inner spline 6 of case 5. Thus, the wheel hub 7 is forcedly rotated by the bolts 8 coupling the case 5 therewith.

In this prior hub clutch, there have been observed several drawbacks as follows.

(1) The manufacture of the case 5 requires additional processes for the spline 6 provided at the inner surface of case 5, (2) The case 5 is enlarged in diameter because a plurality of the bolts 8 are annularly positioned to be axially inserted through the case 5 at its outer periphery, (3) The case 5 is manufactured of a material having a high mechanical strength because the case 5 is adapted to convey the torque of the driven clutch 3 to the wheel hub 7, (4) The manufacture of the sleeve member 11a and the driven clutch 3 is very difficult because they have spline grooves, and (5) The construction of the coupling means 10 is very complicated because many snap rings etc. are required.

SUMMARY OF THE INVENTION

Accordingly, it is an object of the present invention to provide a hub clutch which is smaller in size and lighter in weight than the prior art hub clutch.

It is another object of the present invention to provide a hub clutch having a case which is easy to manufacture in fewer processes and which has an inner space of a larger inner diameter than the prior art hub clutch so that the driven clutch can have a larger inner diameter to accomodate necessary parts therein.

It is a further object of the present invention to provide a hub clutch in which parts of a coupling means may be easily manufactured in fewer process operations.

According to the present invention, a hub clutch for the torque connection between a power shaft and a wheel hub comprises a drive clutch with coupling teeth and adapted to be connected to a power shaft, a driven clutch moving axially and having coupling teeth on its inner surface and semicircular grooves provided at its outer periphery, a case secured to the wheel hub by means of a plurality of bolts, coupling means having a spring to provide a preload on the driven clutch, and actuator means for effecting movement of the driven clutch toward the drive clutch, wherein the torque of the driven clutch is conveyed to the wheel hub by engagement between the semi-circular grooves and the bolts as the driven clutch is coupled with the drive clutch by the coupling of the respective teeth thereof due to the movement of the driven clutch toward the drive clutch effected by the actuator means.

The above and other objects, advantages and features of the following description of the present invention will become more readily understood and appreciated from a consideration of the preferred embodiment when taken together with the accompanying drawings in which:

BRIEF DESCRIPTION OF THE DRAWINGS

FIG. 1 is a cross sectional view illustrating a hub clutch according to the prior art, FIG. 2 is a cross sectional view illustrating an embodiment of the present invention, and FIG. 3 is a perspective view, partially broken, illustrating coupling means in a hub clutch according to the present invention.

DESCRIPTION OF THE PREFERRED EMBODIMENTS

Referring to FIG. 2, there is shown a hub clutch according to the present invention. The hub clutch comprises a drive clutch 1 having coupling teeth 2 which is adapted to be connected to a power shaft 12, a driven clutch 3 which moves axially and has coupling teeth 9 and semi-circular grooves 4 provided at its outer periphery, a case 5 secured to a wheel hub 7 by means of a plurality of bolts 8, coupling means 10 having a spring 11 to provide a preload on the driven clutch 3, and actuator means for effecting movement of the drive clutch 3 toward the drive clutch 1. The bolts 8 have shaft portions 8a each of which is partially exposed on the inner surface of the case 5 so that the axially movable driven clutch 3 can engage with the exposed shaft portions 8a in such a manner that the semi-circular grooves 4 of the driven clutch 3 hold the inner portions of the shaft portions 8a.

The driven clutch 3 is provided with the coupling teeth 9 on its inner surface at the side facing the drive clutch 1 and spline grooves 13 at its opposite side. The coupling teeth 9 of the driven clutch 3 are adapted to couple with the coupling teeth 2 of the drive clutch 1 as the former moves axially toward the drive clutch 1.

The actuator means comprises a nob 14 which is provided with a screw groove 15 on the outer surface of its shaft portion 16. The knob 14 is inserted into and secured to the case 5 by means of a retainer 17 and a snap ring 17a so that the knob 14 is freely rotatable by a manual operation.

As also shown in FIG. 3, the coupling means 10 comprises a spring 11, a spring holder 18 having lugs 19 and a flange 19a provided at its opposite sides, a pair of washers 20 and 21 nipping the spring 11 therebetween, and snap ring 22 put into an annular groove of the driven clutch 3.

The spring holder 18 may be of steel and is also provided with projections 23 on its inner surface which are adapted to be engaged with the screw groove 15 of the knob shaft portion 16. In addition, the spring holder 18 is connected to the driven clutch 3 in such a manner that the lugs 19 of the former engage with a step portion between the coupling teeth 9 and the spline grooves 13 of the latter. Thus, the spring holder is not allowed to rotate with respect to the driven clutch 3. On the other hand, the washer 21 is allowed to move toward the left as viewed in FIG. 2 with the flange 19a while it is not allowed to move toward the right beyond the snap ring 22 due to abutment therewith.

In operation, the knob 14 is manually rotated by a predetermined angle so that the spring holder 18 moves toward the left. This causes the driven clutch 3 to axially move in the same direction, thereby resulting in the coupling of the respective teeth 2 and 9 for the connection of the drive and driven clutches 1 and 3.

Consequently, the torque of the driven clutch 3 is conveyed to the wheel hub by the engagement between the semi-circular grooves 4 and the exposed portions of the shaft portions 8a of the bolts 8.

On the other hand, if the coupling teeth 2 and 9 of the drive and driven clutches 1 and 3 are not in a position to couple with each other when the driven clutch 3 moves axially toward the drive clutch 1, the spring 11 stores energy to later force the driven clutch 3 to move axially due to the fact that the driven clutch 3 can not further move toward the left. Under this condition, when the drive and driven clutches' coupling teeth 2 and 9 come into a position to couple with each other, the coupling is attained between the drive and driven clutches 1 and 3 because the stored energy of the spring 11 forces the driven clutch 3 to further slide to the left.

Next, when the drive and driven clutches 1 and 3 are to be disconnected from each other, the knob 14 is manually rotated in the reverse direction by the predetermined angle so that the spring holder 18 moves to the right. As a result, the washer 21 is forced to move along with the snap ring 22 by the spring 11 in the spring holder 18. This causes the driven clutch 3 to axially move in the same direction, thereby resulting in the release of the respective coupling teeth 2 and 9 for the disconnection of the drive and driven clutches 1 and 3.

Especially, when it is difficult to disconnect the drive and driven clutches 1 and 3 due to friction between the coupling teeth 2 and 9, only the spring holder 18 moves to the right along with the washer 20, thereby compressing the spring 11 so that the spring 11 stores energy to move the driven clutch 3. Under this condition, the drive and driven clutches 1 and 3 can be disconnected by the release of the stored energy of the compressed spring 11 when the friction between the coupling teeth 2 and 9 is instantly decreased.

Although the present invention has been described with reference to a preferred embodiment thereof, many modifications and alterations may be made within the spirit and scope of the present invention.

What I claim is:

1. A hub clutch for providing torque connection between a power shaft and a wheel hub, said hub clutch comprising:
   a drive clutch adapted to be connected to a power shaft, said drive clutch having coupling teeth;
   a driven clutch having coupling teeth and mounted for axial movement between an engaged position whereat said driven clutch coupling teeth mesh with said drive clutch coupling teeth and a disengaged position whereat said driven clutch coupling teeth are out of engagement with said drive clutch coupling teeth, said driven clutch having at the outer periphery thereof a plurality of axially extending substantially semi-circular grooves;
   a case surrounding said driven clutch and adapted to be connected to a wheel hub;
   a plurality of bolts for connecting said case to the wheel hub, said bolts having portions received within said semi-circular grooves, the engagement of said bolt portions within said semi-circular grooves comprising the sole structural connection between said driven clutch and said case;
   coupling means operatively connected to said driven clutch for imparting thereto a preload; and
   actuator means, connected to said driven clutch by means of said coupling means, for moving said driven clutch from said disengaged position thereof to said engaged position thereof, whereby said driven clutch is coupled to said drive clutch and the resultant torque from said driven clutch is transferred to said case solely by engagement between said semi-circular grooves and said bolt portions.

2. A hub clutch as claimed in claim 1, wherein said bolt portions comprise portions of the shafts of said bolts, and said shaft portions are exposed on the inner surface of said case and are received within said semi-circular grooves.

3. A hub clutch as claimed in claim 1, wherein said drive clutch coupling teeth are on the outer periphery of said drive clutch, and said driven clutch coupling teeth are on the inner surface of said drive clutch.

4. A hub clutch as claimed in claim 1, wherein said actuator means comprises a manually operable knob mounted on said case and having a shaft portion extending inwardly thereof, said shaft portion having an external screw groove.

5. A hub clutch as claimed in claim 4, wherein said coupling means comprises an annular spring holder positioned within said driven clutch, said spring holder having on the inner surface thereof at least one projection fitting within said screw groove of said actuator means, whereby rotation of said knob causes axial movement of said spring holder.

6. A hub clutch as claimed in claim 5, wherein said spring holder has on an end thereof facing said drive clutch lugs extending into splined grooves on the inner surface of said driven clutch, and said spring holder has on an opposite end thereof a flange, and said coupling means further comprises a spring member surrounding said spring holder between said lugs and said flange, and a pair of washers having an outer diameter smaller than that of said lugs and nipping therebetween said spring member.

* * * * *